United States Patent
Reily et al.

(10) Patent No.: US 12,185,050 B2
(45) Date of Patent: Dec. 31, 2024

(54) ADAPTIVE HEADPHONE SYSTEM

(71) Applicant: Bose Corporation, Framingham, MA (US)

(72) Inventors: Todd Richard Reily, North Reading, MA (US); Keith Dana Martin, Westborough, MA (US); Ruben M. Carbonell, Northbridge, MA (US); Elio Dante Querze, Arlington, MA (US); Conor William Sheehan, Natick, MA (US); Amanda Whitt, Boston, MA (US); Saurabh Khanwalkar, Newton, MA (US)

(73) Assignee: Bose Corporation, Framingham, MA (US)

( * ) Notice: Subject to any disclaimer, the term of this patent is extended or adjusted under 35 U.S.C. 154(b) by 0 days.

(21) Appl. No.: 17/347,430

(22) Filed: Jun. 14, 2021

(65) Prior Publication Data

US 2021/0306735 A1   Sep. 30, 2021

Related U.S. Application Data

(63) Continuation of application No. 16/816,634, filed on Mar. 12, 2020, now Pat. No. 11,039,240, which is a
(Continued)

(51) Int. Cl.
*H04R 1/10*    (2006.01)
*G06F 3/16*    (2006.01)
(Continued)

(52) U.S. Cl.
CPC ........... *H04R 1/1041* (2013.01); *G06F 3/165* (2013.01); *G06F 3/167* (2013.01); *H04R 5/033* (2013.01);
(Continued)

(58) Field of Classification Search
CPC .. H04R 1/1041; H04R 5/033; H04R 2420/07; H04R 2430/01; H04R 2460/07; G06F 3/165; G06F 3/167; H04S 7/304
(Continued)

(56) References Cited

U.S. PATENT DOCUMENTS

2010/0020978 A1*  1/2010  Garudadri ................ G08B 1/08
                                                    381/57
2011/0196519 A1*  8/2011  Khoury ............ H04N 21/42201
                                                    700/94
(Continued)

*Primary Examiner* — Norman Yu
(74) *Attorney, Agent, or Firm* — Hoffman Warnick LLC

(57) ABSTRACT

Various implementations include headphone systems configured to adapt to changes in user environment. In some particular cases, a headphone system includes at least one headphone including an acoustic transducer having a sound-radiating surface for providing an audio output; a sensor system configured to detect an environmental condition proximate the at least one headphone; and a control system coupled with the at least one headphone and the sensor system, the control system configured to: receive data about the environmental condition from the sensor system; and modify the audio output at the at least one headphone in response to a change in the environmental condition, wherein the audio output includes a continuous audio output provided across a transition between environmental conditions and is configured to vary with the change in the environmental condition.

16 Claims, 4 Drawing Sheets

Related U.S. Application Data continuation of application No. 16/048,640, filed on Jul. 30, 2018, now Pat. No. 10,595,114.

(60) Provisional application No. 62/538,849, filed on Jul. 31, 2017.

(51) Int. Cl.
 *H04R 5/033* (2006.01)
 *H04S 7/00* (2006.01)

(52) U.S. Cl.
 CPC ...... *H04R 2420/07* (2013.01); *H04R 2430/01* (2013.01); *H04R 2460/07* (2013.01); *H04S 7/304* (2013.01)

(58) Field of Classification Search
 USPC ....... 381/26, 57, 317, 23.1, 71.1, 71.2, 71.8, 381/71.11, 74, 94.1
 See application file for complete search history.

(56) References Cited

U.S. PATENT DOCUMENTS

| | | | | |
|---|---|---|---|---|
| 2011/0293123 | A1* | 12/2011 | Neumeyer | H04R 25/558 |
| | | | | 707/E17.08 |
| 2012/0221329 | A1* | 8/2012 | Harsch | H04R 3/02 |
| | | | | 704/E21.002 |
| 2014/0254830 | A1* | 9/2014 | Tomono | H03G 3/3005 |
| | | | | 381/107 |
| 2014/0334644 | A1* | 11/2014 | Selig | G06F 3/165 |
| | | | | 381/108 |
| 2015/0373477 | A1* | 12/2015 | Norris | H04M 1/72457 |
| | | | | 381/303 |
| 2017/0361468 | A1* | 12/2017 | Cheuvront | G06F 3/01 |

* cited by examiner

ADAPTIVE HEADPHONE SYSTEM

PRIORITY CLAIM

This application claims priority to pending U.S. patent application Ser. No. 16/816,634 (Adaptive Headphone System), filed on Mar. 12, 2020, which claims priority to U.S. patent application Ser. No. 16/048,640 (Adaptive Headphone System), filed on Jul. 30, 2018, now granted under U.S. Pat. No. 10,595,114, on Mar. 17, 2020, which itself claims priority to U.S. Provisional Patent Application 62/538,849 (Adaptive Headphone System), filed on Jul. 31, 2017, the entire contents of each of which are incorporated herein by reference.

TECHNICAL FIELD

This disclosure generally relates to audio systems. More particularly, the disclosure relates to audio systems, such as headphones, including an adaptive module for modifying audio feeds across different environments.

BACKGROUND

Portable electronic devices, including headphone and other audio systems are becoming more commonplace. However, the user experience with these audio systems is limited by the inability of these systems to adapt to different environments.

SUMMARY

All examples and features mentioned below can be combined in any technically possible way.

Various implementations include audio systems, such as headphone systems, configured to adapt audio output based upon particular environmental conditions. In other implementations, a computer-implemented method is disclosed for controlling an audio system, such as a headphone system.

In some particular aspects, a headphone system is disclosed including: at least one headphone including an acoustic transducer having a sound-radiating surface for providing an audio output; a sensor system configured to detect an environmental condition proximate the at least one headphone; and a control system coupled with the at least one headphone and the sensor system, the control system configured to: receive data about the environmental condition from the sensor system; and modify the audio output at the at least one headphone in response to a change in the environmental condition, where the audio output includes a continuous audio output provided across a transition between environmental conditions and is configured to vary with the change in the environmental condition.

In other particular aspects, a computer-implemented method of controlling a headphone system configured to provide an audio output is disclosed. In these cases, the method can include: receiving data indicating an environmental condition proximate the at least one headphone from a sensor system; and modifying the audio output at the at least one headphone system in response to a change in the environmental condition, where the audio output includes a continuous audio output provided across a transition between environmental conditions and is configured to vary with the change in the environmental condition.

Implementations may include one of the following features, or any combination thereof.

In some implementations, the audio output is at a decibel level ranging between approximately 50-70 decibels (dB). In certain cases, modifying the audio output includes decreasing or increasing the decibel level of the continuous audio output in response to the change in the environmental condition.

In certain implementations, the sensor system includes a position tracking system, and the environmental condition includes a location of the at least one headphone. In some cases, the location includes a proximity to a location of interest.

In certain cases, the sensor system includes at least one of an accelerometer or a gyroscope, and the environmental condition includes an acceleration of the at least one headphone or a deceleration of the at least one headphone. In some implementations, the control system is configured to increase a volume of the audio output or an intensity of the audio output in response to receiving data indicating the headphone is accelerating. In certain cases, the control system is configured to decrease a volume of the audio output or an intensity of the audio output in response to receiving data indicating the headphone is decelerating.

In some implementations, the control system is coupled with a smart device having access to a user profile or biometric information about a user, and the control system is configured to modify the audio output at the at least one headphone based upon the user profile or the biometric information about the user. In certain cases, the user profile includes settings for audio notifications at the at least one headphone, and the control system is configured to modify the audio output at the at least one headphone according to the settings.

In some cases, the sensor system includes a microphone, and the environmental condition includes an ambient audio signal. In certain implementations, the ambient audio signal includes a voice of a user, and the control system is configured to detect the voice of the user and modify the audio output in response to a voice command from the user. In some implementations, the control system is further configured to: analyze the voice command from the user for a speech pattern; and modify the audio output based upon the speech pattern in the voice command from the user.

In certain cases, the sensor system includes a wireless transceiver configured to detect an audio cache proximate the at least one headphone, and the control system is configured to provide a notification about the audio cache in response to the wireless transceiver detecting the audio cache. In particular implementations, the audio cache is stored in a local network at a geographic location or in a cloud storage system connected with the geographic location. In some cases, the audio cache includes a song, a pre-recorded message from a user or a pre-recorded message from an information source.

In certain implementations, the control system is further configured to provide a feedback prompt during the modifying of the audio output, the feedback prompt including an option to: refuse the modification of the audio output or alter the modification of the audio output.

Implementations may include one of the following features, or any combination thereof.

Two or more features described in this disclosure, including those described in this summary section, may be combined to form implementations not specifically described herein.

The details of one or more implementations are set forth in the accompanying drawings and the description below.

Other features, objects and advantages will be apparent from the description and drawings, and from the claims.

Figure 1:
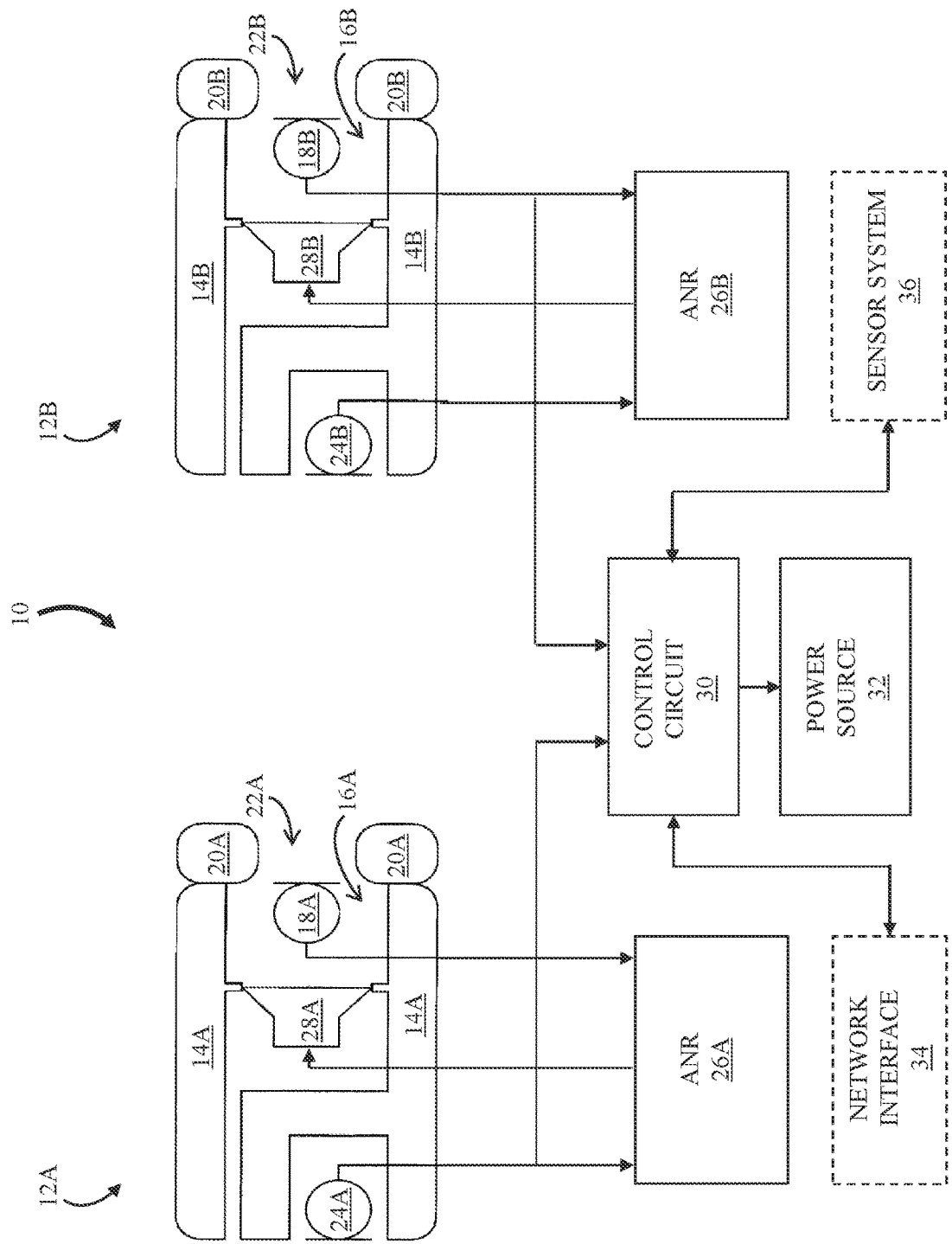
FIG. 1 is a block diagram depicting an example personal audio device according to various disclosed implementations.

It is noted that the drawings of the various implementations are not necessarily to scale. The drawings are intended to depict only typical aspects of the disclosure, and therefore should not be considered as limiting the scope of the implementations. In the drawings, like numbering represents like elements between the drawings.

DETAILED DESCRIPTION

This disclosure is based, at least in part, on the realization that an audio control system can be beneficially incorporated into an audio system to provide for added functionality. For example, an audio control system can help to enable, among other things, adaptive audio based upon environmental changes and predictive playback functionality.

Commonly labeled components in the FIGURES are considered to be substantially equivalent components for the purposes of illustration, and redundant discussion of those components is omitted for clarity.

It has become commonplace for those who either listen to electronically provided audio (e.g., audio from an audio source such as a mobile phone, tablet, computer, CD player, radio or MP3 player), those who simply seek to be acoustically isolated from unwanted or possibly harmful sounds in a given environment, and those engaging in two-way communications to employ personal audio devices to perform these functions. For those who employ headphones or headset forms of personal audio devices to listen to electronically provided audio, it is commonplace for that audio to be provided with at least two audio channels (e.g., stereo audio with left and right channels) to be separately acoustically output with separate earpieces to each ear. For those simply seeking to be acoustically isolated from unwanted or possibly harmful sounds, it has become commonplace for acoustic isolation to be achieved through the use of active noise reduction (ANR) techniques based on the acoustic output of anti-noise sounds in addition to passive noise reduction (PNR) techniques based on sound absorbing and/or reflecting materials. Further, it is commonplace to combine ANR with other audio functions in headphones.

Aspects and implementations disclosed herein may be applicable to a wide variety of personal audio devices, such as a portable speaker, headphones, and wearable audio devices. Unless specified otherwise, the term headphone, as used in this document, includes various types of personal audio devices such as around-the-ear, over-the-ear and in-ear headsets, earphones, earbuds, hearing aids, or other wireless-enabled audio devices structured to be positioned near, around or within one or both ears of a user. Unless specified otherwise, the term wearable audio device, as used in this document, includes various types of personal audio devices such as shoulder or body-worn acoustic devices that include one or more acoustic drivers to produce sound without contacting the ears of a user. It should be noted that although specific implementations of personal audio devices primarily serving the purpose of acoustically outputting audio are presented with some degree of detail, such presentations of specific implementations are intended to facilitate understanding through provision of examples, and should not be taken as limiting either the scope of disclosure or the scope of claim coverage.

Aspects and implementations disclosed herein may be applicable to personal audio devices that either do or do not support two-way communications, and either do or do not support active noise reduction (ANR). For personal audio devices that do support either two-way communications or ANR, it is intended that what is disclosed and claimed herein is applicable to a personal audio device incorporating one or more microphones disposed on a portion of the personal audio device that remains outside an ear when in use (e.g., feedforward microphones), on a portion that is inserted into a portion of an ear when in use (e.g., feedback microphones), or disposed on both of such portions. Still other implementations of personal audio devices to which what is disclosed and what is claimed herein is applicable will be apparent to those skilled in the art.

FIG. 1 is a block diagram of an example of a personal audio device 10 having two earpieces 12A and 12B, each configured to direct sound towards an ear of a user. Reference numbers appended with an "A" or a "B" indicate a correspondence of the identified feature with a particular one of the earpieces 12 (e.g., a left earpiece 12A and a right earpiece 12B). Each earpiece 12 includes a casing 14 that defines a cavity 16. In some examples, one or more internal microphones (inner microphone) 18 may be disposed within cavity 16. An ear coupling 20 (e.g., an ear tip or ear cushion) attached to the casing 14 surrounds an opening to the cavity 16. A passage 22 is formed through the ear coupling 20 and communicates with the opening to the cavity 16. In some examples, an outer microphone 24 is disposed on the casing in a manner that permits acoustic coupling to the environment external to the casing.

In implementations that include ANR, the inner microphone 18 may be a feedback microphone and the outer microphone 24 may be a feedforward microphone. In such implementations, each earphone 12 includes an ANR circuit 26 that is in communication with the inner and outer microphones 18 and 24. The ANR circuit 26 receives an inner signal generated by the inner microphone 18 and an outer signal generated by the outer microphone 24, and performs an ANR process for the corresponding earpiece 12. The process includes providing a signal to an electroacoustic transducer (e.g., speaker) 28 disposed in the cavity 16 to generate an anti-noise acoustic signal that reduces or substantially prevents sound from one or more acoustic noise sources that are external to the earphone 12 from being heard by the user. As described herein, in addition to providing an anti-noise acoustic signal, electroacoustic transducer 28 can utilize its sound-radiating surface for providing an audio output for playback, e.g., for a continuous audio feed.

A control circuit 30 is in communication with the inner microphones 18, outer microphones 24, and electroacoustic transducers 28, and receives the inner and/or outer microphone signals. In certain examples, the control circuit 30 includes a microcontroller or processor having a digital signal processor (DSP) and the inner signals from the two inner microphones 18 and/or the outer signals from the two outer microphones 24 are converted to digital format by analog to digital converters. In response to the received inner and/or outer microphone signals, the control circuit 30 can take various actions. For example, audio playback may be initiated, paused or resumed, a notification to a wearer may be provided or altered, and a device in communication with the personal audio device may be controlled. The personal audio device 10 also includes a power source 32. The control circuit 30 and power source 32 may be in one or both of the earpieces 12 or may be in a separate housing in communication with the earpieces 12. The personal audio device 10 may also include a network interface 34 to provide communication between the personal audio device 10 and one or more audio sources and other personal audio devices. The network interface 34 may be wired (e.g., Ethernet) or wireless (e.g., employ a wireless communication protocol such as IEEE 802.11, Bluetooth, Bluetooth Low Energy, or other local area network (LAN) or personal area network (PAN) protocols).

Network interface 34 is shown in phantom, as portions of the interface 34 may be located remotely from personal audio device 10. The network interface 34 can provide for communication between the personal audio device 10, audio sources and/or other networked (e.g., wireless) speaker packages and/or other audio playback devices via one or more communications protocols. The network interface 34 may provide either or both of a wireless interface and a wired interface. The wireless interface can allow the personal audio device 10 to communicate wirelessly with other devices in accordance with any communication protocol noted herein. In some particular cases, a wired interface can be used to provide network interface functions via a wired (e.g., Ethernet) connection.

In some cases, the network interface 34 may also include a network media processor for supporting, e.g., Apple AirPlay® (a proprietary protocol stack/suite developed by Apple Inc., with headquarters in Cupertino, Calif., that allows wireless streaming of audio, video, and photos, together with related metadata between devices) or other known wireless streaming services (e.g., an Internet music service such as: Pandora®, a radio station provided by Pandora Media, Inc. of Oakland, Calif., USA; Spotify®, provided by Spotify USA, Inc., of New York, N.Y., USA); or vTuner®, provided by vTuner.com of New York, N.Y., USA); network-attached storage (NAS) devices). For example, if a user connects an AirPlay® enabled device, such as an iPhone or iPad device, to the network, the user can then stream music to the network connected audio playback devices via Apple AirPlay®. Notably, the audio playback device can support audio-streaming via AirPlay® and/or DLNA's UPnP protocols, and all integrated within one device. Other digital audio coming from network packets may come straight from the network media processor through (e.g., through a USB bridge) to the control circuit 30. As noted herein, in some cases, control circuit 30 can include a processor and/or microcontroller, which can include decoders, DSP hardware/software, etc. for playing back (rendering) audio content at electroacoustic transducers 28. In some cases, network interface 34 can also include Bluetooth circuitry for Bluetooth applications (e.g., for wireless communication with a Bluetooth enabled audio source such as a smartphone or tablet). In operation, streamed data can pass from the network interface 34 to the control circuit 30, including the processor or microcontroller. The control circuit 30 can execute instructions (e.g., for performing, among other things, digital signal processing, decoding, and equalization functions), including instructions stored in a corresponding memory (which may be internal to control circuit 30 or accessible via network interface 34 or other network connection (e.g., cloud-based connection). The control circuit 30 may be implemented as a chipset of chips that include separate and multiple analog and digital processors. The control circuit 30 may provide, for example, for coordination of other components of the personal audio device 10, such as control of user interfaces (not shown) and applications run by the personal audio device 10.

In addition to a processor and/or microcontroller, control circuit 30 can also include one or more digital-to-analog (D/A) converters for converting the digital audio signal to an analog audio signal. This audio hardware can also include one or more amplifiers which provide amplified analog audio signals to the electroacoustic transducer(s) 28, which each include a sound-radiating surface for providing an audio output for playback. In addition, the audio hardware may include circuitry for processing analog input signals to provide digital audio signals for sharing with other devices.

The memory in control circuit 30 can include, for example, flash memory and/or non-volatile random access memory (NVRAM). In some implementations, instructions (e.g., software) are stored in an information carrier. The instructions, when executed by one or more processing devices (e.g., the processor or microcontroller in control circuit 30), perform one or more processes, such as those described elsewhere herein. The instructions can also be stored by one or more storage devices, such as one or more (e.g. non-transitory) computer- or machine-readable mediums (for example, the memory, or memory on the processor/microcontroller). As described herein, the control circuit 30 (e.g., memory, or memory on the processor/microcontroller) can include a control system including instructions for controlling adaptive audio functions according to various particular implementations. It is understood that portions of the control system (e.g., instructions) could also be stored in a remote location or in a distributed location, and could be fetched or otherwise obtained by the control circuit 30 (e.g., via any communications protocol described herein) for execution. The instructions may include instructions for controlling adaptive audio processes (i.e., the software modules include logic for processing inputs from a user and/or sensor system to manage audio streams), as well as digital signal processing and equalization. Additional details may be found in U.S. Patent Application Publication 2014/0277644, U.S. Patent Application Publication 20170098466, U.S. Patent Application Publication 20140277639, and U.S. Patent Application No. 62/538,853 ("Conversational Audio Assistant,"), the disclosures of which are incorporated herein by reference in their entirety.

Personal audio device 10 can also include a sensor system 36 coupled with control circuit 30 for detecting one or more conditions of the environment proximate personal audio device 10. Sensor system 36 can include one or more local sensors (e.g., inner microphones 18 and/or outer microphones 24) and/or remote or otherwise wirelessly (or hard-wired) sensors for detecting conditions of the environment proximate personal audio device 10 as described herein. As described further herein, sensor system 36 can include a plurality of distinct sensor types for detecting environmental conditions proximate the personal audio device 10.

According to various implementations, the audio playback devices (which may be, for example, personal audio device 10 of FIG. 1) described herein can be configured to provide adaptive audio outputs based upon one or more environmental factors. These particular implementations can allow a user to experience continuous, contextual audio content throughout changing environments. These implementations can enhance the user experience in comparison to conventional audio systems, e.g., portable audio systems or audio systems spanning distinct environments.

Figure 2:
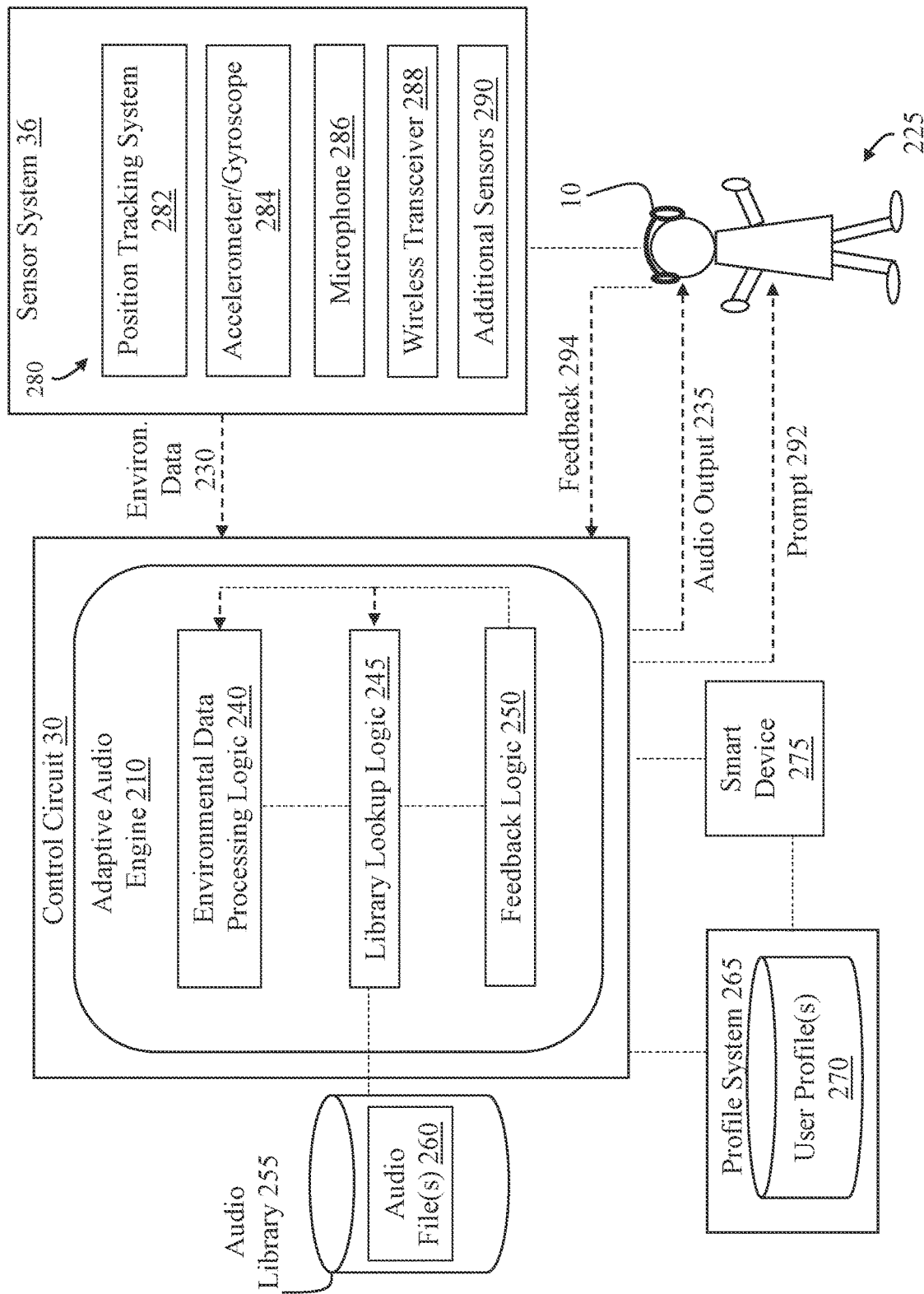
FIG. 2 shows a schematic data flow diagram illustrating a control process performed by an adaptive audio engine in the personal audio device of FIG. 1.

As described with respect to FIG. 1, control circuit 30 can execute (and in some cases store) instructions for controlling adaptive audio functions in personal audio device 10 and/or other audio playback devices in a network of such devices. As shown in FIG. 2, control circuit 30 can include an adaptive audio engine 210 configured to implement modifications in audio outputs at the transducer (e.g., speaker) 28 (FIG. 1) in response to a change in environmental conditions. In various particular embodiments, adaptive audio engine 210 is configured to receive data about an environmental condition from sensor system 36, and modify the audio output at transducer(s) 28 in response to a change in the environmental condition. In particular implementations, the audio output includes a continuous audio output provided across a transition between environmental conditions, which is configured to vary with the change(s) in environmental condition.

Figure 3:
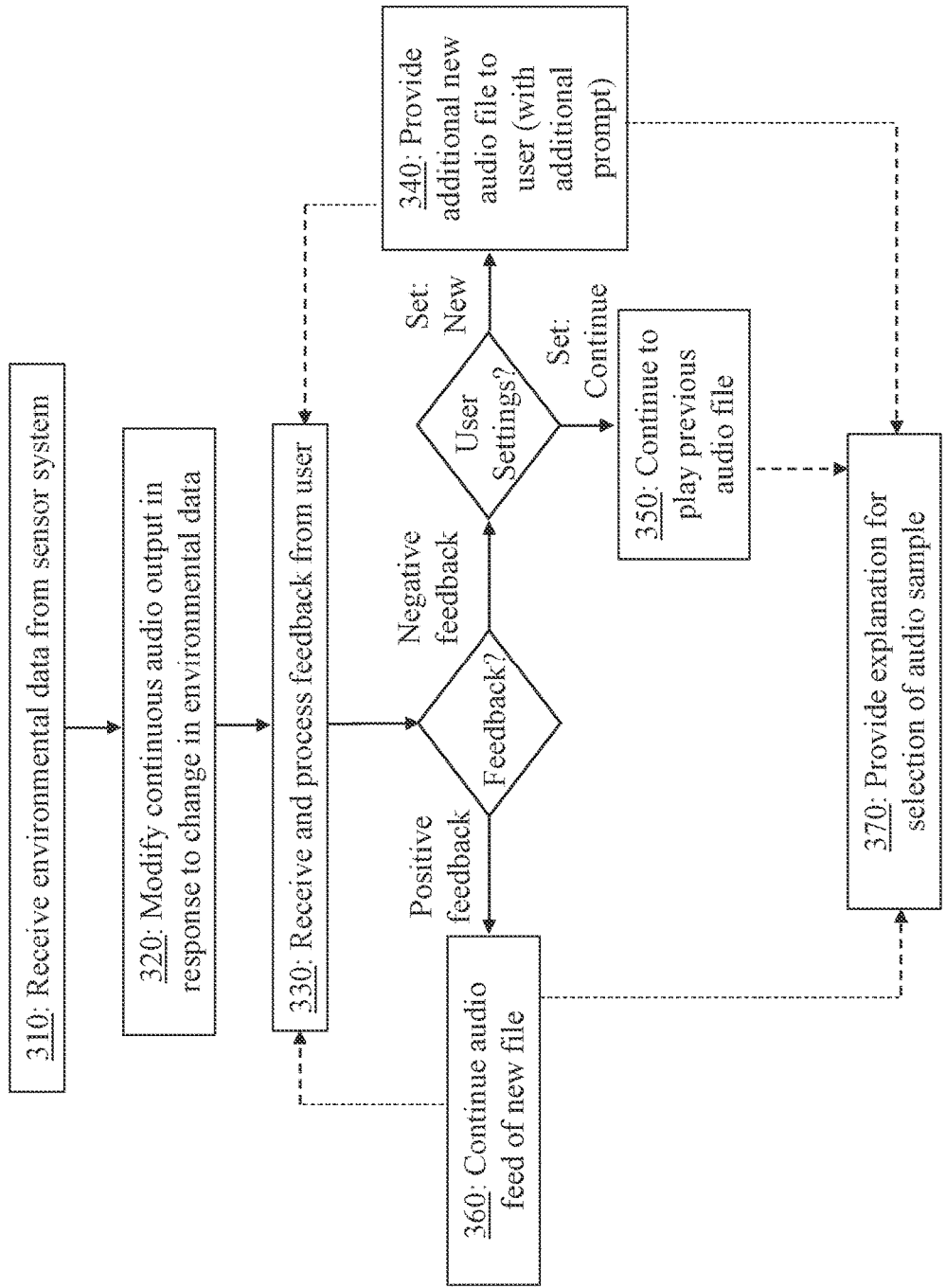
FIG. 3 shows a process flow diagram illustrating processes performed by the adaptive audio engine shown in FIG. 2.
Figure 4:
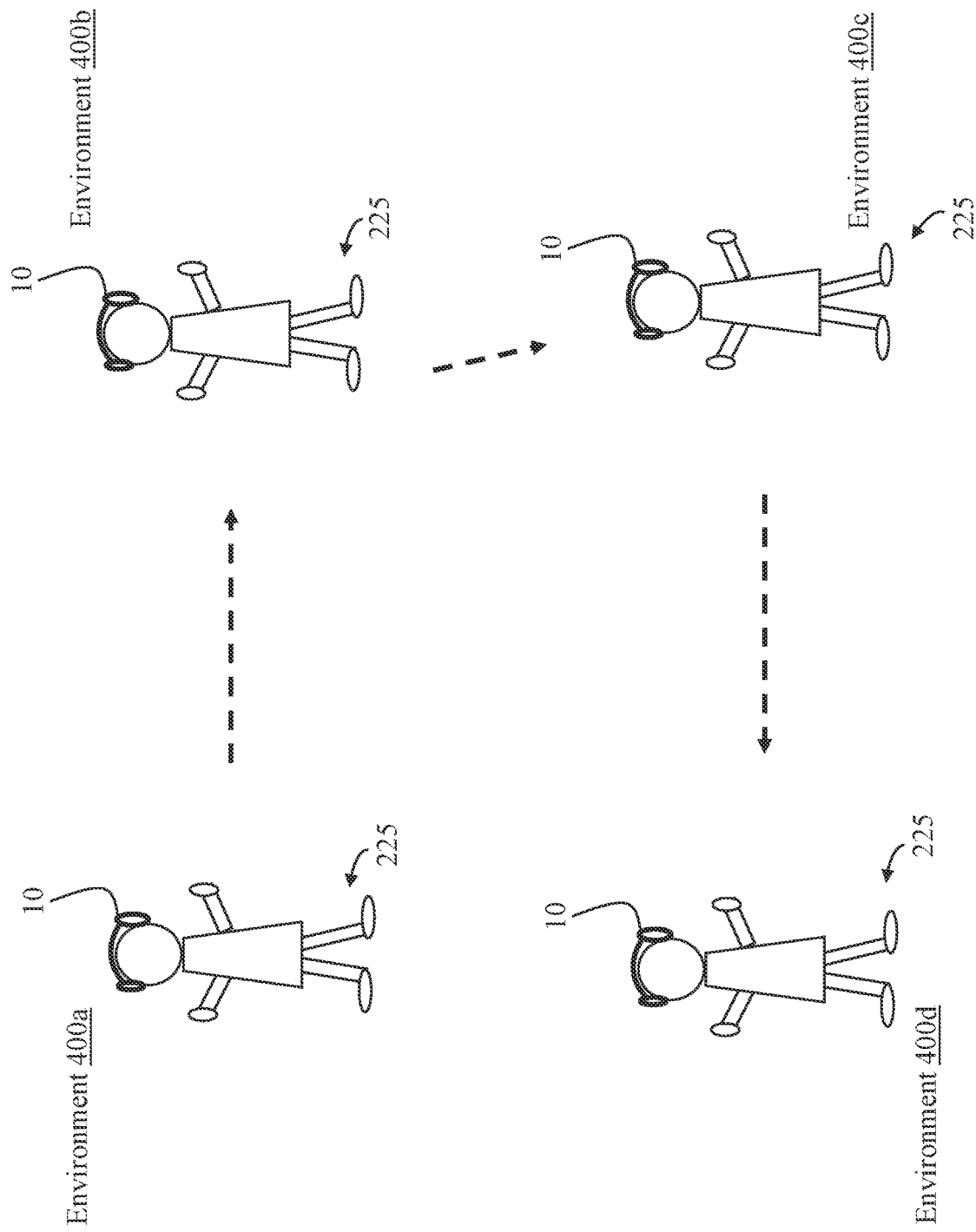
FIG. 4 shows a schematic depiction of a user with the personal audio device of FIGS. 1 and 2 in a plurality of environments.

In particular, FIG. 2 shows a schematic data flow diagram illustrating a control process performed by adaptive audio engine 210 in connection with a user 225. It is understood that in various implementations, user 225 can include a human user. FIG. 3 shows a process flow diagram illustrating processes performed by adaptive audio engine 210 according to various implementations. FIG. 4 shows a schematic depiction of a user 225 in distinct environments 400a, 400b, 400c, etc. to illustrate example operations of adaptive audio engine 210 and personal audio device 10. FIGS. 1-4 are referred to simultaneously, with particular emphasis on FIGS. 2-4.

Returning to FIG. 2, data flows between adaptive audio engine 210 and other components in personal audio device 10 are shown. It is understood that one or more components shown in the data flow diagram may be integrated in the same physical housing, e.g., in the housing of personal audio device 10, or may reside in one or more separate physical locations.

According to various implementations, control circuit 30 includes the adaptive audio engine 210, or otherwise accesses program code for executing processes performed by adaptive audio engine 210 (e.g., via network interface 34). Adaptive audio engine 210 can include logic for processing environmental data 230 from sensor system 36 and providing a continuous audio output (i.e., audio stream or feed) 235 to user 225 that varies across distinct environments 400a, 400b, 400c, etc. (FIG. 4). In some cases, this logic can include environmental data processing logic 240, library lookup logic 245 and feedback logic 250.

Adaptive audio engine 210 can be coupled (e.g., wirelessly and/or via hardwired connections in personal audio device 10) with an audio library 255, which can include audio files 260 for playback (e.g., streaming) at personal audio device 10 and/or a profile system 265 including user profiles 270 about one or more user(s) 225. Audio library 255 can include any library associated with digital audio sources accessible via network interface 34 (FIG. 1) described herein, including locally stored, remotely stored or Internet-based audio libraries. User profiles 270 may be user-specific, community-specific, device-specific, location-specific or otherwise associated with a particular entity such as user 225. User profiles 270 can include user-defined playlists of digital music files available from network audio sources coupled with network interface 34 (FIG. 1), such as network-attached storage (NAS) devices, and/or a DLNA server, which may be accessible to the personal audio device 10 (FIG. 1) over a local area network such as a wireless (Wi-Fi) or wired (Ethernet) home network, as well as Internet music services such as Pandora®, vTuner®, Spotify®, etc., which are accessible to the audio personal audio device 10 over a wide area network such as the Internet. In some cases, profile system 265 is located in a local server or a cloud-based server, similar to any such server described herein. User profile 270 may include information about frequently played audio files associated with user 225 or other similar users (e.g., those with common audio file listening histories, demographic traits or Internet browsing histories), "liked" or otherwise favored audio files associated with user 225 or other similar users, frequency with which particular audio files are changed by user 225 or other similar users, etc. Profile system 265 can be associated with any community of users, e.g., a social network, subscription-based music service (such as a service providing audio library 255), and may include audio preferences, histories, etc. for user 225 as well as a plurality of other users.

Adaptive audio engine 210 can also be coupled with a smart device 275 that has access to a user profile (e.g., profile 270) or biometric information about user 225. It is understood that smart device 275 can include one or more personal computing devices (e.g., desktop or laptop computer), wearable smart devices (e.g., smart watch, smart glasses), a smart phone, a remote control device, a smart beacon device (e.g., smart Bluetooth beacon system), a stationary speaker system, etc. Smart device 275 can include a conventional user interface for permitting interaction with user 225, and can include one or more network interfaces for interacting with control circuit 30 and other components in personal audio device 10 (FIG. 1). In some example implementations, smart device 275 can be utilized for: connecting personal audio device 10 to a Wi-Fi network; creating a system account for the user 225; setting up music services; browsing of content for playback; setting preset assignments on the personal audio device 10 or other audio playback devices; transport control (e.g., play/pause, fast forward/rewind, etc.) for the personal audio device 10; and selecting one or more personal audio devices 10 for content playback (e.g., single room playback or synchronized multi-room playback). In some cases smart device 275 may also be used for: music services setup; browsing of content; setting preset assignments on the audio playback devices; transport control of the audio playback devices; and selecting personal audio devices 10 (or other playback devices) for content playback. Smart device 275 can further include embedded sensors for measuring biometric information about user 225, e.g., travel, sleep or exercise patterns; body temperature; heart rate; or pace of gait (e.g., via accelerometer(s).

Adaptive audio engine 210 is configured to receive environmental data 230 about distinct environments 400a, 400b, 400c, etc. (FIG. 4) from sensor system 36. Environmental data 230 is described herein with reference to the various forms of sensor system 36 configured for sensing such data.

As shown in FIG. 2, sensor system 250 can include one or more of the following sensors 280: a position tracking system 282; an accelerometer/gyroscope 284; a microphone (e.g., including one or more microphones) 286 (which may include or work in concert with microphones 18 and/or 24); and a wireless transceiver 288. These sensors are merely examples of sensor types that may be employed according to various implementations. It is further understood that sensor system 36 can deploy these sensors in distinct locations and distinct sub-components in order to detect particular environmental information relevant to user 225.

The position tracking system 282 can include one or more location-based detection systems such as a global positioning system (GPS) location system, a Wi-Fi location system, an infra-red location system, a Bluetooth beacon system, etc. Position tracking system 282 can be configured to detect changes in the physical location of the personal audio device 10 and/or user 225 (where user 225 is separated from personal audio device 10) and provide updated environmental data 230 to the adaptive audio engine 210 in order to indicate a change in the environment 400a, 400b, 400c, etc. proximate user 225 e.g., a change in location of the user 225 or a change in a condition proximate user. In some example implementations, this position tracking system 282 can detect that user 225 has moved from a rural location to an urban location, or that user 225 has walked from a city street into his/her office, or that user 225 has reached a location proximate to a location of interest (e.g., a landmark, a location linked with the calendar of user 225 or profile 270 of user, or a location previously visited by user 225, friends of user 225 or other similar users in a social network).

The accelerometer/gyroscope 284 can include distinct accelerometer components and gyroscope components, or could be collectively housed in a single sensor component. This component may be used to sense gestures based on movement of the user's body (e.g., head, torso, limbs) while the user is wearing the personal audio device 10 or interacting with another device (e.g., smart device 275) connected with personal audio device 10. As with any sensor in sensor system 36, accelerometer/gyroscope 284 may be housed within personal audio device 10 or in another device connected to the personal audio device 10. In some example implementations, the accelerometer/gyroscope 284 can detect an acceleration of the user 225 and/or personal audio device 10 or a deceleration of the user 225 and/or personal audio device 10.

The microphone 286 (which can include one or more microphones, or a microphone array) can have similar functionality as the microphone(s) 18 and 24 shown and described with respect to FIG. 1, and may be housed within personal audio device 10 or in another device connected to the personal audio device 10. As noted herein, microphone 286 may include or otherwise utilize microphones 18 and 24 to perform functions described herein. Microphone 286 can be positioned to receive ambient audio signals (e.g., audio signals proximate personal audio device 10). In some cases, these ambient audio signals include speech/voice input from user 225 to enable voice control functionality. In some other example implementations, the microphone 286 can detect the voice of user 225 and/or of other users proximate to or interacting with user 225. In particular implementations, adaptive audio engine 210 is configured to analyze one or more voice commands from user 225 (via microphone 286) for a speech pattern, and modify audio output 235 based upon that identified speech pattern.

For example, environmental data processing logic 240 in adaptive audio engine 210 can include logic for analyzing vocal patterns or voice-to-text pattern recognition (e.g., natural language processing (NLP) logic or other similar logic) for detecting a speech pattern in the voice of user 225. In these cases, adaptive audio engine 210 can modify audio output 235 to provide a match or best-match for the user's speech pattern, e.g., where an audio prompt or other command is provided to user 225, and that audio output 235 can be presented to the user 225 in a similar speech pattern as the pattern detected at microphone 286. In particular implementations, where the user has a particular dialect, vocabulary or language preference, adaptive audio engine 210 can modify the audio output to match that speech pattern.

Returning to sensor system 36, wireless transceiver 288 (comprising a transmitter and a receiver) can include, for example, a Bluetooth (BT) or Bluetooth Low Energy (BTLE) transceiver or other conventional transceiver device, and may be configured to communicate with other transceiver devices in distinct environments 400a, 400b, 400c, etc. (FIG. 4). In some example implementations, wireless transceiver 288 can be configured to detect an audio cache proximate personal audio device 10, e.g., in a local network at a geographic location or in a cloud storage system connected with the geographic location. For example, another user, a business establishment, government entity, tour group, etc. could leave an audio cache (e.g., a song or pre-recorded message) at particular geographic (or virtual) locations, and wireless transceiver 288 can be configured to detect this cache and prompt user 225 regarding playback of the cache file.

It is understood that any number of additional sensors 290 could be incorporated in sensor system 36, and could include temperature sensors or humidity sensors for detecting changes in weather within environments, optical/laser-based sensors and/or vision systems for tracking movement or speed, light sensors for detecting time of day, additional audio sensors (e.g., microphones) for detecting human or other user speech or ambient noise, etc.

As noted herein, adaptive audio engine 210 can include logic for performing audio control functions according to various implementations. FIG. 3 shows a flow diagram illustrating processes in adaptive audio control performed by adaptive audio engine 210 and its associated logic. FIG. 4 illustrates a single user 225 in distinct environments 400a, 400b, 400c and 400d, which may include distinct physical locations, or may include the same physical location with a distinct environmental condition. For example, environment 400a could include the interior of a user's office (e.g., sitting at his/her desk), while environment 400b could include the interior of that same user's automobile (e.g., sitting in the driver's seat). Environment 400c could include the same physical location as environment 400a (user's office), but could be distinct in terms of the ambient audio at that location. For example, sensor system 36 (e.g., microphone 286) could detect the voice of user 225 and another user and determine that a conversation is ongoing in the office. This environmental condition (represented as environmental data 230) can cause a change in environment 400a, versus environment 400c, while not changing the physical location of user 225 and/or personal audio device 10. FIG. 3 is referred to concurrently with FIG. 2.

Turning to the process flow in FIG. 3, adaptive audio engine 210 receives environmental data 230 from sensor system 36 (process 310), and modifies the continuous audio output 235 to headphone 28 (in personal audio device 10) in response to a change in the environmental data 230 (process 320). As noted herein, the audio output 235 includes a continuous audio output provided across a transition between environmental conditions and is configured to vary with the detected change in environmental condition (e.g., changes from environment 400a to environment 400b and then to environment 400c).

Environmental data 230 can include data about one or more environmental conditions detected by sensor system 36, and may include data about a plurality of environmental conditions. For example, environmental data 230 could include data about a position of the personal audio device 10

(e.g., from position tracking system 282) data about an acceleration of personal audio device 10 (e.g., from accelerometer/gyroscope 284), data about the ambient audio conditions proximate personal audio device 10 (e.g., from microphone 286) or data about nearby audio, video or other data caches (e.g., from wireless transceiver 288).

Returning to FIG. 2, in various implementations, environmental data processing logic 240 is configured to process the environmental data 230 and provide a weighted environmental representation to library lookup logic 245 to enable fetching a type of audio file 260 for providing in the continuous audio output 235. That is, environmental data processing logic 240 can include weightings or factoring for one or more of user preferences (e.g., user profile(s) 270), sensor data about past events (e.g., position and/or acceleration information about personal audio device 10 over given periods), audio files (e.g., audio samples of user's voices, as sampled by microphone 286), and other readily available data (e.g., a demographic profile of a plurality of users with at least one common attribute with the user or a categorical popularity of an audio file 260). The weighted environmental representation may indicate a general characteristic of the environment 400a, 400b, 400c, etc., as a combination of factors from environmental (sensor) data 230, profile(s) 270 and/or information from smart device 275.

After processing the environmental data 230 with environmental data processing logic 240, library lookup logic 245 can search audio library 255 for files 260 using the weighted environmental representation from environmental data processing logic 240. Library lookup logic 245 may include a relational database with relationships between the weighted environmental representation and audio files 260. As noted herein, audio library 255 can be locally stored at personal audio system 10 (FIG. 1) and/or stored at one or more remote or cloud-based servers. Library lookup logic 245 can be continually updated based upon changes in audio library 255 in order to provide accurate, timely associations between the weighted environmental representation from language processing logic 245 and audio files 260.

In some example implementations, adaptive audio engine 210 (e.g., using environmental data processing logic 240 and/or language processing logic 245) is configured to perform one or more of the following logic processes using environmental data 230 and/or other data accessible via profile system 265, smart device 275, etc.: speech recognition, speaker identification, speaker verification, word spotting (e.g., wake word detection), speech end pointing (e.g., end of speech detection), speech segmentation (e.g., sentence boundary detection or other types of phrase segmentation), speaker diarization, affective emotion classification on voice, acoustic event detection, two-dimensional (2D) or three-dimensional (3D) beam forming, source proximity/location, volume level readings, acoustic saliency maps, ambient noise level data collection, signal quality self-check, gender identification (ID), age ID, echo cancellation/barge-in/ducking, language identification, and/or other environmental classification such as environment type (e.g., small room, large room, crowded street, etc.; and quiet or loud).

After library lookup logic 245 selects the audio file 260, that audio stream is provided (i.e., rendered) at transducer 28 (FIG. 1) as part of continuous audio output 235. In some examples, audio output 235 is configured to transition between audio files 260 in a fade-out/fade-in format, but in some other implementations, the transition between audio files 260 can be abrupt. In other implementations, the audio output 235 can include an introduction to an audio file 260 (e.g., the beginning of a song or other audio feed (e.g., a sporting event broadcast, an audio file of a movie, interview, documentary, educational programming, etc.), or a portion of such a song or other audio file 260 selected to represent that song or audio file 260 (e.g., the chorus of a song)).

Additionally, the adaptive audio engine 210 is configured to provide a prompt 292 for feedback about the audio output 235 along with, prior to, or after the transition between audio files 260. The prompt 292 can include any prompt described herein, such as via a user interface or other interface (e.g., a user input interface on smart device 275), or may include an audio prompt (provided via speaker 28 with response capable via microphone 286 or microphones 18 or 24 (FIG. 1)) for feedback about the transition between audio files 260 in continuous audio output 235.

In various embodiments, where prompt 292 is an audio prompt, it can include a phrase such as "Did you enjoy this transition?", "Would you like to continue this audio stream?", or "Would you like to hear this audio cache stored by your friend at this location?" Prompt 292 can include any spoken phrase, word or clause intended to elicit a response from user 225, or can include a displayed prompt (e.g., similar to audio phrase, or with a Yes/No/Maybe or other visual prompt with touch-screen or push-button response capabilities), such as a prompt displayed at smart device 275 or other device within range of user 225. In various implementations, prompt 292 can be provided to the user 225 without an intervening audio input from user 225, such that user 225 is not required to prompt adaptive audio engine 210 (e.g., by using an initiation term such as a name) in order to provide feedback. That is, the control circuit 30 can maintain the microphone(s) 286 in a query mode during the transition in audio files 260, such that the system actively awaits a response from the user 225. In some implementations, microphone(s) 286 can remain in an optional response mode while providing the audio output 235 and/or prompt 292. That is, control circuit 30 can maintain microphone(s) 286 in a listen mode for a set period, with an expectation that user 225 may or may not respond (e.g., with a "Thanks," compliment or other feedback about audio output 235 and/or prompt 292).

In various implementations, the audio output 235 is provided through the at least one speaker 28 (FIG. 1) at a decibel level ranging between approximately 50-70 decibels (dB). That is, audio output 235 can be provided to user 225 at a decibel level range which falls within the spectrum of "background" sound relative to the ambient sound in environments 400a, 400b, 400c, etc. In particular implementations, audio output 235 is intended to act as a "soundtrack" for user 225 as he/she travels through differing environments 400a, 400b, 400c, etc. In this sense, audio output 235, which may be rendered at personal audio device 10 and/or other playback devices described herein, is provided to user 225 as he/she walks/drives/runs/bicycles through daily activities. In various particular cases, user 225 experiences a changing audio output 235 (e.g., audio stream) in a seamless manner between distinct environments 400a, 400b, 400c, etc. However, due to the varying nature of environments 400a, 400b, 400c, etc., audio output 235 may be set at a decibel level such that it does not interfere with audio within each particular environment.

Additionally, adaptive audio engine 210 can modify the decibel level of or intensity of the audio output 235 in response to detecting a change in one or more environmental conditions from sensor system 36, e.g., by reducing decibel level or intensity level (e.g., type of audio file 260) when detecting the user's voice or another voice at microphone 286, by increasing decibel level (or increasing intensity by switching to an up-tempo audio file 260) when accelerometer/gyroscope 284 and/or position tracking system 282 indicate user 225 is moving at a particularly fast pace, or by reducing decibel level when providing a prompt 292 (e.g., "Sue has left an audio cache at this location, would you like to hear it?", "Mary and Steve listened to this song the last time they visited this restaurant, would you like to hear it?", or "Your location indicates you are traveling to Boston, would you like to listen to an audio introduction to the city's popular sights?").

In some cases, prompt 292 is provided at an approximately equal or greater decibel level as audio output 235, in order to enhance the chances that user 225 recognizes the prompt 292 and provides useful feedback. In some particular embodiments, audio output 235 is provided (i.e., rendered) at transducer 28 (FIG. 1) at a first decibel level, then the audio output 235 is faded out to a reduced decibel level while prompt 292 is provided, and audio output 235 is then faded in to the original decibel level while adaptive audio engine 210 awaits a response to prompt 292 at microphone 286 or other interface. In various embodiments, the prompt 292 can trail the transition in audio files 260 in audio output 235 or overlap with only a portion of the new audio file 260 to allow user 225 to consider the new audio file 260 prior to providing feedback.

With continuing reference to FIGS. 2-4, according to various implementations, adaptive audio engine 210 can further include feedback logic 250 for receiving and processing feedback 294 from user 225 (process 330). In some cases, feedback 294 includes negative feedback from user 225 about the change in audio output 235 (e.g., "I don't like this song", "No", "Change", "Next" or a similar response to a user interface prompt such as a thumbs-down, "No" vote, etc.). In other cases, feedback 294 includes positive feedback from user 225 about the audio sample 240 (e.g., "Yes", "Good", "Continue" or a similar response to a user interface prompt such as a thumbs-up, "Yes" vote, etc.). In various implementations, user 225 can provide either a verbal response or a response to a user interface prompt.

In some cases, feedback 294, or other audio inputs (e.g., environmental data 230) includes an audio signal, and may be analyzed using acoustic feature extraction for one or more features including: energy, zero-crossing rate, mel-frequency cepstral coefficients, spectral flatness, summary statistics (e.g., mean, variance, skew or kurtosis) on any signal measurement, tempo/beats-per-minute and acoustic fingerprinting. In some cases, audio files 260 can include "text" metadata, which can allow adaptive audio engine 210 to perform metadata feature extraction on audio file(s) 260. This metadata feature extraction can include, for example, matching and linking features to a database (e.g., audio library 255) and/or retrieving/analyzing additional audio and semantic attributes of the audio file(s) 260, e.g., genre, mood, themes or related artists. Adaptive audio engine 210 (and logic therein) can use these acoustic features from feedback 294 or other audio inputs, and metadata features from audio files 260, to perform statistical and probabilistic modeling in order to recommend other similar audio file(s) 260 and/or recommend audio streams (e.g., radio stations, albums, playlists or artists).

In response to the user 225 providing negative feedback about the new audio file 260 in audio output 235, adaptive audio engine 210 is configured to either provide an additional new file 260 to user 225 along with an additional prompt 292 for feedback (process 340, FIG. 3), or continue to play the previous audio file 260 (process 350, FIG. 3). This decision can be made by adaptive audio engine 210 based upon the user profile 270 associated with user 225 or with other user settings. For example, as shown in FIG. 3, in some cases, where user 225 provides negative feedback about the modified audio output 235 (new audio file 260), adaptive audio engine 210 may check user profile 270 to determine whether user has settings for playing an additional new audio file 260 (Set: New) in response to negative feedback, which may include an additional feedback prompt (process 340), or whether the profile 270 includes settings (Set: Continue) for continuing the previous audio file 260 in response to negative feedback (process 350). In some cases, a default setting could include playing the previous audio file (process 350).

In response to the user 225 providing positive feedback about the new audio file 260 in continuous audio output 235, adaptive audio engine 210 is configured to continue an audio feed of the new audio file 260 (process 360, FIG. 3). In these cases, the new audio file 260 may be modified to play from the beginning of the particular stream (e.g., beginning of a song, where the sample was taken from a distinct portion of the song), or may continue to play through its entirety unless otherwise modified by the user 225. In various particular implementations, a positive response to the prompt 292 can include a null response (e.g., no verbal command from user 225) after a waiting period (e.g., 10 seconds, 20 seconds).

As shown in FIG. 2, feedback logic 250 is connected with environmental data processing logic 240 and can process feedback 294 and provide that feedback 294 to environmental data processing logic 240 and library lookup logic 245. In some cases, feedback logic 250 can be configured to teach environmental data processing logic 240 and library lookup logic 245 about preferences of user 225, e.g., where one or more of these logic components includes an artificial intelligence (AI) component for iteratively refining logic operations to enhance the accuracy of its results. Example AI components could include machine learning logic, a neural network including an artificial neural network, a natural language processing engine, a deep learning engine, etc. In any case, feedback logic 250 can be configured to analyze feedback 294 and enhance future operations of adaptive audio engine 210. It is further understood that feedback logic 250, library lookup logic 245 and/or environmental data processing logic 240 may be interconnected in such a manner that these components act in concert or in reliance upon one another.

In some particular embodiments, as illustrated in FIG. 3, adaptive audio engine 210 is configured to provide an explanation for selection of the new audio file 260 in continuous audio output 235 in response to receiving either positive or negative feedback about the change in audio output 235 from user 225 (process 370, shown in phantom as optional). The explanation can include another audio stream, e.g., similar to prompt 292, and may include a phrase such as, "This song was selected because you liked another song by this artist," or "Your friends listened to this song the last time they visited this location," or "You listened to this soundtrack on your last jog down this route and you exceeded your previous best time." In these cases, user 225 may elect particular explanation settings (e.g., in user profile 270 or in other settings) such that explanations do not overwhelm the experience, e.g., such that explanations are only provided in response to negative feedback, or that explanations are only provided after a plurality of negative feedback responses. Additionally, explanations could include additional prompts (or act as prompts themselves) to allow user 225 to verify that particular selection criteria are relevant to his/her interests. In various implementations, prompt(s) 292 (including explanations, suggestions, etc.) and feedback 294, can be exchanged between the user 225 and the adaptive audio engine 210 via real-time audio exchange (e.g., audio inputs/outputs via microphones and speakers), real-time exchange via smart device (e.g., via user interface(s) on one or more smart devices 275) or via these mechanisms at a later (delayed) time.

In some implementations, adaptive audio engine 210 is configured to work in concert with sensor system 36 to continually monitor changes in one or more environmental conditions. In some cases, sensor system 36 may be set in an active mode, such as where position tracking system 282 pings nearby Wi-Fi networks to triangulate location of the personal audio device 10, or microphone 286 (or microphones 18 and/or 24) remains in a "listen" mode for particular ambient sounds. In other implementations, sensor system 36 and adaptive audio engine 210 can be configured in a passive mode, such as where wireless transceiver 288 detects signals transmitted from nearby transceiver devices or network devices. In still other implementations, distinct sensors in the sensor system 36 can be set in distinct modes for detecting changes in environmental conditions and transmitting updated environmental data 230 to adaptive audio engine 210. For example, some sensors in sensor system 36 can remain in an active mode while audio device 10 is active (e.g., powered on), while other sensors may remain in a passive mode for triggering by an event.

As noted herein, in contrast to conventional audio systems, the personal audio device 10 disclosed according to various implementations can allow a user 225 to experience a continuous, contextual audio stream across a variety of environments 400a, 400b, 400c, etc. For example, as shown in FIG. 4, a user 225 can move between distinct environments 400a, 400b, 400c and 400d, or those environments may change in terms of one or more environmental conditions (e.g., time of day, ambient noise level, temperature) while the user 225 experiences a continuous audio output 235 that varies across a plurality of environments 400a, 400b, 400c (e.g., changes with a transition between environments or actively provides the option to transition between environments).

First Environment

In some implementations, environment 400a could include a live sporting event, such as a baseball game in the City of Boston. One or more sensors (e.g., position tracking system 282, FIG. 2) could detect that user 225 is physically located within a baseball park during a baseball game (e.g., where game-time data is pulled by additional sensors or via Internet search or calendar data via smart device 275). Adaptive audio engine 210 could select an audio file 260 that is appropriate for the baseball game, for example, an audio stream of the radio broadcast on a local sports network. As described herein, the audio output 235 of this file may be at a decibel level such that user 225 has the ability to hear the audio stream relative to the surrounding noise (e.g., as detected by microphone 286, or microphone(s) 18 or 24 (FIG. 1)) without overwhelming the live experience, that is, without interfering with the ambient audio at the baseball game. User 225 can pre-define this decibel level (e.g., in profile 270), or may adjust this decibel level dynamically using any control device described herein.

Second Environment

As the game concludes, user 225 walks out of the baseball park and into another environment 1100b adjacent the baseball park (e.g., onto a street such as Yawkey Way). Sensor system 36 may detect (e.g., via position tracking system 282 and/or accelerometer/gyroscope 284) that user 225 is picking up pace and walking quickly, and send corresponding environmental data 230 to adaptive audio engine 210. The adaptive audio engine 210 may process this environmental data 230 and select a new audio file 260 for audio output 235, such as an up-tempo rock song by the Dropkick Murphys or the band Boston. As the user's pace increases, adaptive audio engine 210 could increase the decibel level of the audio output 235, e.g., based upon settings in user profile 270 or additional environmental data 230 such as the level of ambient noise as measured by microphone 286. Additionally, adaptive audio engine 210 could infer, based on the user's prior habits, that the user is walking towards his/her neighborhood, and select an audio playlist that is of an appropriate duration for the user's walk, so that the user can complete listening to the full playlist before entering the next environment.

Third Environment

As the user 225 leaves the area proximate the ballpark and enters a quiet residential area in environment 400c, sensor system 36 may detect (e.g., via position tracking system 282 and/or accelerometer/gyroscope 284) that user 225 is slowing down in pace, and that rain is starting to fall (e.g., via microphone 286, data from smart device 275 or additional sensors 290 such as humidity sensors), and send corresponding environmental data 1100 to adaptive audio engine 210. The adaptive audio engine 210 may process this environmental data 230 and select a new audio file 260 for audio output 235 in environment 400c, such as a song about rain (e.g., "Who'll Stop The Rain" by Creedence Clearwater Revival) or a weather broadcast about current or future weather conditions in the area.

Fourth Environment

As the user 225 approaches his/her home and walks through the door in environment 400d, sensor system 36 may detect this location (e.g., via position tracking system 282, wireless transceiver 288, and/or additional sensors 290 detecting a home Wi-Fi network or proximity to other electronic devices known to be in user's home) and send corresponding environmental data 230 to adaptive audio engine 210. The adaptive audio engine 210 may process this environmental data 230 and select a new audio file 260 for audio output 235 in environment 400d, such as a relaxing and/or familiar song liked by the user 225, e.g., from profile settings in profile 270 or frequently played via one or more streaming services connected with audio library 255 (e.g., "Take Me Home, Country Roads" by John Denver). In some particular implementations, adaptive audio engine 210 could transfer the audio output 235 to a different device, e.g., as the location of user 225 changes. In this example, when user 225 enters his/her home, the audio output 235 could be transitioned from a wearable device (e.g., headphone system) to a playback device located in the home (e.g., a speaker system).

In this sense, user 225 traverses multiple environments with a continuous, contextual audio stream tailored to his/her preferences and the changing environments. Because the user 225 is not required to prompt adaptive audio engine 210 to modify the continuous audio stream, user 225 can focus on additional stimuli in the surrounding environments, and enjoy enhanced transitions between distinct environments.

The above-noted example process provides several location-based examples of changes in environments, however, as noted herein, environments (and associated environmental data 230) can change according to any measurable parameter that can be detected by sensor system 36. While particular types of sensors, and modes of operation (e.g., active v. passive detection) may be more practicable than others with given hardware constraints (e.g., in a personal audio device 10), it is understood that any sensor described herein can be employed by sensor system 36 to detect a change in environment around user 225.

The functionality described herein, or portions thereof, and its various modifications (hereinafter "the functions") can be implemented, at least in part, via a computer program product, e.g., a computer program tangibly embodied in an information carrier, such as one or more non-transitory machine-readable media, for execution by, or to control the operation of, one or more data processing apparatus, e.g., a programmable processor, a computer, multiple computers, and/or programmable logic components.

A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing all or part of the functions can be performed by one or more programmable processors executing one or more computer programs to perform the functions of the calibration process. All or part of the functions can be implemented as, special purpose logic circuitry, e.g., an FPGA and/or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Components of a computer include a processor for executing instructions and one or more memory devices for storing instructions and data.

In various implementations, components described as being "coupled" to one another can be joined along one or more interfaces. In some implementations, these interfaces can include junctions between distinct components, and in other cases, these interfaces can include a solidly and/or integrally formed interconnection. That is, in some cases, components that are "coupled" to one another can be simultaneously formed to define a single continuous member. However, in other implementations, these coupled components can be formed as separate members and be subsequently joined through known processes (e.g., soldering, fastening, ultrasonic welding, bonding). In various implementations, electronic components described as being "coupled" can be linked via conventional hard-wired and/or wireless means such that these electronic components can communicate data with one another. Additionally, sub-components within a given component can be considered to be linked via conventional pathways, which may not necessarily be illustrated.

A number of implementations have been described. Nevertheless, it will be understood that additional modifications may be made without departing from the scope of the inventive concepts described herein, and, accordingly, other embodiments are within the scope of the following claims.

We claim:

1. An audio device comprising:
    an acoustic transducer for providing audio output at a decibel level;
    at least one microphone for receiving ambient audio signals; and
    a control system coupled to the acoustic transducer and the at least one microphone, the control system configured to
        cause the acoustic transducer to provide audio output,
        receive ambient audio signals from the at least one microphone, and
        in response to determining that the ambient audio signals received from the at least one microphone indicates a change in one or more environmental conditions, modify the decibel level of the audio output provided by the acoustic transducer,
        wherein modifying the decibel level of the audio output provided by the acoustic transducer includes
            increasing the decibel level in response to an increase in an environmental sound level and
            decreasing the decibel level in response to a decrease in the environmental sound level,
        wherein the decibel level is set such that it does not interfere with the environmental sound level,
        wherein the decibel level is kept at a pre-defined decibel level relative to the environmental sound level, wherein keeping the audio output at the pre-defined decibel level relative to the environmental sound level maintains the audio output at a background sound level while the environmental sound level changes.

2. The audio device of claim 1, wherein the change in one or more environmental conditions includes detecting a voice of a user of the audio device, and wherein modifying the decibel level of the audio output provided by the acoustic transducer includes decreasing the decibel level.

3. The audio device of claim 2, wherein detecting the voice of the user of the audio device includes analyzing the ambient audio signals for a speech pattern associated with the user to identify the voice of the user.

4. The audio device of claim 1, wherein the at least one microphone is used to perform active noise reduction (ANR), and
    wherein the audio output includes a continuous audio output of an audio stream or an audio feed, including at least one audio file, wherein the continuous audio output continues through changes in the one or more environmental conditions.

5. The audio device of claim 1, wherein the change in one or more environmental conditions includes detecting a voice of a user of the audio device and a voice of at least one other person, and wherein modifying the decibel level of the audio output provided by the acoustic transducer includes decreasing the decibel level.

6. The audio device of claim 1, wherein the change in one or more environmental conditions includes detecting a user of the audio device is moving at a faster pace, and wherein modifying the decibel level of the audio output provided by the acoustic transducer includes increasing the decibel level.

7. The audio device of claim 1, wherein modifying the decibel level of the audio output provided by the acoustic transducer is based on settings in a user profile.

8. The audio device of claim 1, wherein the decibel level is kept in the range of 50-70 decibels.

9. A computer-implemented method of controlling an audio device, the method comprising:
    causing an acoustic transducer of the audio device to provide audio output at a decibel level;
    receiving ambient audio signals from at least one microphone of the audio device; and in response to determining that the ambient audio signals received from the at least one microphone indicates a change in one or more environmental conditions, modifying the decibel level of the audio output provided by the acoustic transducer,
   wherein modifying the decibel level of the audio output provided by the acoustic transducer includes
      increasing the decibel level in response to an increase in an environmental sound level and
      decreasing the decibel level in response to a decrease in the environmental sound level,
   wherein the decibel level is set such that it does not interfere with the environmental sound level, wherein the decibel level is kept in the range of 50-70 decibels,
   wherein modifying the decibel level of the audio output provided by the acoustic transducer is based on settings in a user profile, and
   wherein the audio output includes a continuous audio output of an audio stream or an audio feed, including at least one audio file, wherein the continuous audio output continues through changes in the one or more environmental conditions.

10. The method of claim 9, wherein the change in one or more environmental conditions includes detecting a voice of a user of the audio device, and wherein modifying the decibel level of the audio output provided by the acoustic transducer includes decreasing the decibel level.

11. The method of claim 10, wherein detecting the voice of the user of the audio device includes analyzing the ambient audio signals for a speech pattern associated with the user to identify the voice of the user.

12. The method of claim 9, wherein the change in one or more environmental conditions includes detecting a voice of a user of the audio device and a voice of at least one other person, and wherein modifying the decibel level of the audio output provided by the acoustic transducer includes decreasing the decibel level.

13. The method of claim 9, wherein the change in one or more environmental conditions includes detecting a user of the audio device is moving at a faster pace, and wherein modifying the decibel level of the audio output provided by the acoustic transducer includes increasing the decibel level.

14. The method of claim 9, wherein the decibel level is kept at a pre-defined decibel level relative to the environmental sound level.

15. An audio device comprising:
   an acoustic transducer for providing audio output at a decibel level;
   at least one microphone for receiving ambient audio signals; and
   a control system coupled to the acoustic transducer and the at least one microphone, the control system configured to
      cause the acoustic transducer to provide audio output,
      receive ambient audio signals from the at least one microphone, and
      in response to determining that the ambient audio signals received from the at least one microphone indicates a change in one or more environmental conditions, modify the decibel level of the audio output provided by the acoustic transducer,
   wherein modifying the decibel level of the audio output provided by the acoustic transducer includes
      increasing the decibel level in response to an increase in an environmental sound level,
      decreasing the decibel level in response to a decrease in the environmental sound level,
      wherein the decibel level is kept at a pre-defined decibel level relative to the environmental sound level,
      wherein keeping the audio output at the pre-defined decibel level relative to the environmental sound level maintains the audio output at a background sound level while the environmental sound level changes.

16. The audio device of claim 15, wherein the decibel level is kept in the range of 50-70 decibels, and
   wherein the audio output includes a continuous audio output of an audio stream or an audio feed, including at least one audio file, wherein the continuous audio output continues through changes in the one or more environmental conditions.

* * * * *